Aug. 16, 1932.  A. P. SACHS  1,872,349
REMOVING SULPHUR FROM OILS
Filed Oct. 6, 1928
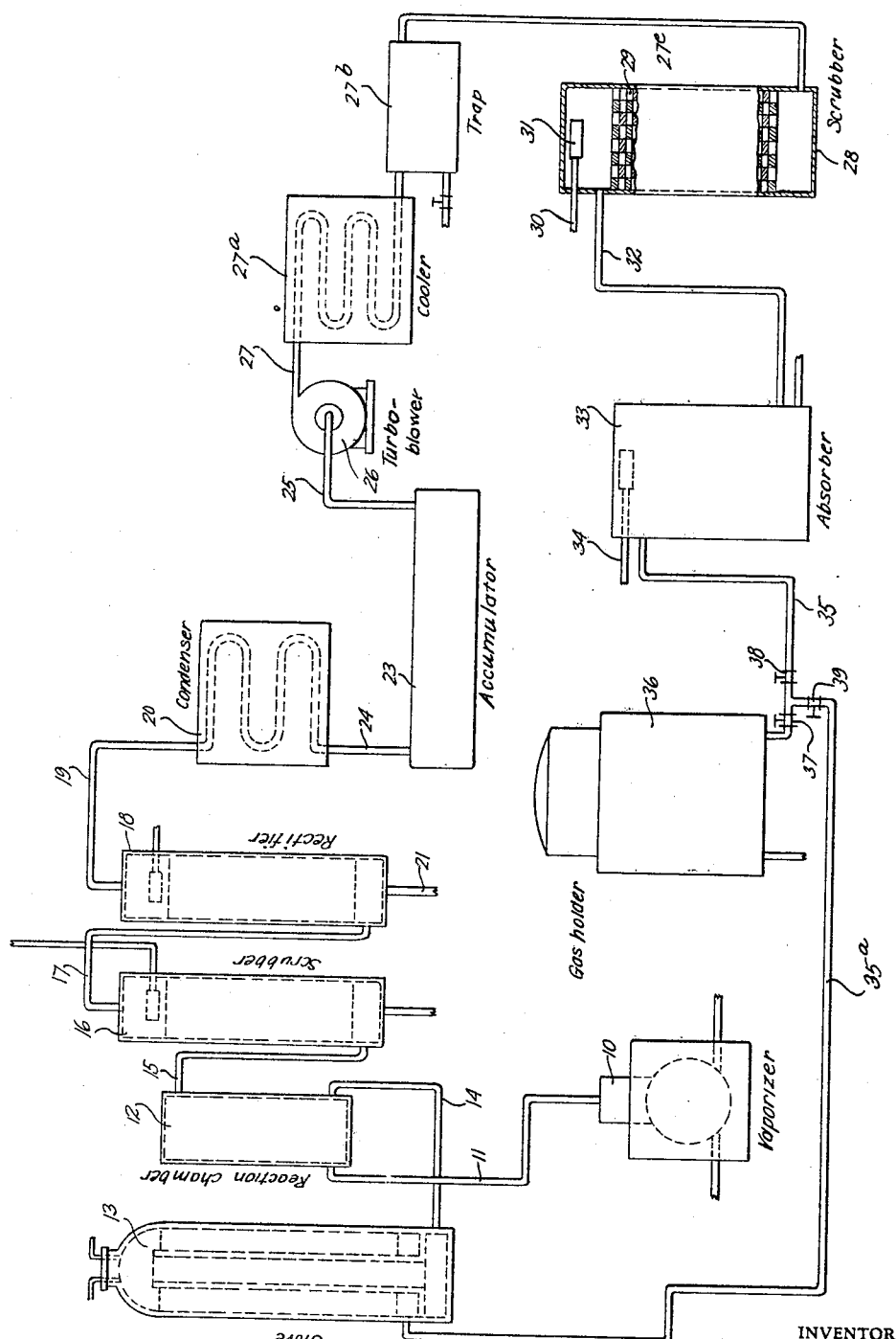
INVENTOR
ALBERT P. SACHS
BY
Sydney G. Berry
ATTORNEY Patented Aug. 16, 1932

1,872,349

UNITED STATES PATENT OFFICE

ALBERT P. SACHS, OF NEW YORK, N. Y., ASSIGNOR TO PETROLEUM CONVERSION CORPORATION, OF NEW YORK, N. Y., A CORPORATION OF DELAWARE

REMOVING SULPHUR FROM OILS

Application filed October 6, 1928. Serial No. 310,892.

The present invention relates to the conversion of hydrocarbon oils into compounds of lower molecular weight and boiling point adapted for use as motor fuel. More particularly it relates to improvements in certain types of conversion processes whereby oils of comparatively high sulphur content may be converted without an undue percentage of sulphur being left in the principal product of the system.

In a conversion process which involves the use of a neutral agent which is physically mingled with the oil, it is usually desirable to have as much of the sulphur remain with the agent as possible in order to facilitate the removal of sulphur from the system. In the case wherein the oil is physically mingled with a heat-carrier gas (to which the present invention is particularly applicable) it is possible to have a considerable quantity of the sulphur remain with the gas, but where the latter is recycled, its sulphur content is carried back into the system causing in certain cases a great increase of sulphur in the desired product of the system, unless there is a more or less continuous removal of the sulphur from the gas.

In accordance with the present invention I maintain conditions in the reaction chamber practically nonoxidizing, avoiding as much as possible amongst other things the presence of water vapor, so that none of the sulphur or sulphur compounds will be converted to sulphur dioxide $SO_2$, but will largely be converted into hydrogen sulphide, $H_2S$. This hydrogen sulphide is allowed to remain in the carrier gas until such a point in the system is reached where the temperature of the gas is below the boiling point of water under the pressure obtaining in the system, whereupon the sulphur is removed by the simple expedient of washing the gas with water. I have furthermore discovered that this step of sulphur removal is best carried out after the cycle gas has passed through the blower used to propel the carrier gas through the system. Thus I may locate the blower immediately beyond the main condensing system, where the temperature is well below that of the boiling point of water whereupon it will be found that after traversing the blower, the temperature of the gas will have risen several degrees, due to the partially adiabatic conditions under which the gas is compressed. At this point the rewarmed gas is recooled in an aftercooler which may cause a further partial condensation of liquid products. At such point I then preferably wash the gas with water, which performs the function of removing the sulphur. The recooling and washing may be carried out together by spraying water into the compressed gas, or they may be separate and consecutive.

My invention will be best understood by reference to the following detailed description taken with the annexed drawing, which shows more or less diagrammatically a plant to which my invention has been applied.

As previously stated, the process of oil conversion or cracking to which my invention finds particular application consists in bringing about the conversion reaction by the use of a neutral carrier gas heated to the requisite temperature. When the reaction has proceeded for the desired length of time, the products from the reaction chamber are subjected to the necessary condensing conditions, including preferably various heat interchange steps for the saving of heat. This process in its essentials is illustrated in the drawing in which the oil, which preferably has been preheated at another point in the system, is shown entering the vaporizer 10 where it is vaporized under conditions which preferably conduce to a minimum of cracking after which the vapors are led therefrom through the pipe 11, and thence into a reaction chamber 12. Also admitted to this chamber is a carrier gas conveniently of hydrocarbon origin which has been passed through a heating element preferably in the form of a regenerative heater 13 of the hot blast stove type which previously has been brought to the requisite temperature. The carrier gas, which say, has been heated therein to a temperature in the neighborhood of 1400° F., passes from the stove 13 through pipe 14 into the reaction chamber 12 wherein it mingles with the oil vapor from evaporator 10 and causes same to be converted into compounds of lower molecular weight. The products from the reaction chamber 12 including the carrier gas now pass through a pipe 15 to a scrubber 16 wherein carbon is removed from the products without, however, condensing out of the mixture anything except the very heavy ends. From the scrubber 16 the products pass through a pipe 17 to the condensing system proper which is shown as comprised of a rectifier 18, a conduit 19, and a condenser 20. In rectifier 18 the products are contacted with liquid oil at a different stage in the operating cycle, as, for example, the raw entering oil, the liquid products leaving the rectifier through a pipe 21. The liquid products from the condensing system are collected in an accumulator 23 which is joined to condenser 20 by means of a pipe 24.

The carrier gas, together with a large proportion of the sulphur originally in the oil and also with some residual vapors which have escaped condensation in the condensing system leaves the accumulator 23 through a pipe 25 leading to a blower 26, preferably of the turbo type, serving to propel the gas through the system and in which it is necessarily compressed somewhat. From there the gas passes through a pipe 27 preferably to a cooler 27a wherein the excess heat acquired by the compression step (and such additional heat as may be desired) is removed. The vapors condensed in the cooler are removed in a trap 27b after which the gas passes through pipe 27c to a spray condenser 28 in which the gas is sprayed by water entering through a pipe 30 connecting with a spray head 31. Desirably the condenser 28 contains filling material 29 affording a large surface contact of the gas and liquid. The effect of the spray is to remove from the gas substantially all its contained sulphur, which is chiefly in the form of hydrogen sulphide.

After having passed through the scrubber 28 the gas is conveyed through a conduit 32 to an absorber 33 wherein it is stripped of its contained vapors by the action of a suitable menstruum, as, for example, a heavy oil which is admitted through pipe 34. Leaving the absorber 33 the gas, denuded of its contained vapors, passes through pipes 35, 25a back to the stove 13. If desired, all or a portion of the gas which has been additioned by that produced in the conversion reaction may be brought to a gas holder 36, for which purpose valves 37, 38, 39 are provided.

If desired, I may omit the cooler 27a and trap 27b altogether and remove both the heat and the sulphur in the spray condenser 28.

It will be seen from the foregoing that I remove the sulphur from the carrier gas at an advantageous point in the system at which the temperature of the gas is close to the lowest prevailing in the system, this condition taken with the fact that the gas is also at its highest pressure in the system (since it has just passed through the blower) making the concentration of the gaseous sulphur compounds, chiefly $H_2S$, per unit volume of the gas higher than at any previous point in the system, whereby at such point it is most efficiently removed. In addition, the desulphurizing step at this point in the system may perform as has been pointed out the further function of cooling the gas which has been heated by its compression in the blower. It will also be noted that where the water is added at a point in the system where the temperature is very high as in the conversion chamber, oxidation of a part of the sulphur to sulphur dioxide may result due to the oxidizing action of the water vapor, and while sulphur in this form is not readily taken up by the oil condensed out in the condensers, it has a highly corrosive effect upon the metal parts in the system and hence its formation is highly disadvantageous. Furthermore, where the water is added at a point in the system at which the temperature is substantially above the boiling point of water under the pressure prevailing therein, all of the water will be evaporated, making it necessary for the water vapor to be removed in the condensers and thus requiring larger cooling surfaces and a greater amount of cooling water, both of which add to the cost of the process. By adding the water at the point in the system specified and maintaining conditions in the system relatively non-oxidizing, these difficulties are avoided.

While I have described my invention with respect to a process of oil cracking, which I have described in detail, it will be understood that the same is not limited to this particular process but is applicable to any process employing a gas as an aid in carrying out the cracking reaction. It will further be understood that the desulphurizing step may be carried out at points in the system where the temperature is higher than that mentioned with corresponding loss of efficiency.

I claim:

1. In the process of converting hydrocarbon oils into compounds of lower molecular weight in which the conversion of the hydrocarbon is brought about by contacting same with a heat-carrier gas of the requisite volume and heat units, the steps of cooling the gas and vapors down to below the boiling point of water under the conditions prevailing in the system, thereby taking out the majority of the condensable vapors, passing the gas and residual vapors through a blower, and then spraying same with water to remove sulphur compounds from said vapors and gas and also to cool same to a temperature below the boiling point of water at the pressure prevailing in the system and then stripping said desulphurized gas of said residual vapor.

2. In the process of converting hydrocarbon oils into compounds of lower molecular weight, in which a heat-carrier gas is used as an aid to the conversion reaction, the steps of passing the gas containing various of the products of the conversion reaction through a condensing system to separate the vapors of the greater portion of the converted products from the carrier gas, at which point in the system the temperature of said gas is below the boiling point of water under the pressure prevailing in the system, then spraying said gas with water to remove therefrom sulphur compounds and utilizing the desulphurized gas when heated as the heat-carrier to convert additional hydrocarbons.

3. In the process of converting hydrocarbon oils into compounds of lower molecular weight, in which a heat-carrier gas is used as an aid to the conversion reaction, the steps of maintaining said conversion conditions substantially non-oxidizing, passing the gas containing various of the products of the conversion reaction through a condensing system to separate the vapors of the greater portion of the converted products from the carrier gas, at which point in the system the temperature of said gas is below the boiling point of water under the pressure prevailing in the system, then spraying said gas with water to remove therefrom sulphur compounds and utilizing the desulphurized gas when heated as the heat-carrier to convert additional hydrocarbons.

4. In the process of converting hydrocarbon oils into compounds of lower molecular weight suitable as motor fuels, in which a heat-carrier gas is used as an aid to the conversion reaction, the steps of passing the gas containing various of the products of the conversion reaction through a condensing system to separate the vapors of the greater portion of the converted products from the carrier gas, including said compounds of lower molecular weight suitable as motor fuels, compressing said gas whereby to propel the same through the system also to increase the concentration of sulphur compounds therein, then spraying said gas with water to remove therefrom sulphur compounds when the temperature of said gas is not substantially above the boiling point of water at the pressure prevailing in the system and utilizing the desulphurized gas when heated as the heat-carrier to convert additional hydrocarbons.

5. In the process of converting hydrocarbon oils into compounds of lower molecular weight suitable as motor fuels, in which a heat-carrier gas is used as an aid to the conversion reaction, the steps of passing the gas containing various of the products of the conversion reaction through a condensing system to separate the vapors of the greater portion of the converted products from the carrier gas, including said compounds of lower molecular weight suitable as motor fuels, compressing said gas whereby to propel the same through the system and to increase the concentration of sulphur compounds therein, then removing from the gas a portion at least of the heat acquired by the compressing step, then spraying said gas with water to remove therefrom sulphur compounds when the temperature of said gas is not substantially above the boiling point of water at the pressure prevailing in the system and utilizing the desulphurized gas as the heat-carrier when heated to convert additional hydrocarbons.

In testimony whereof I have affixed my signature to this specification.

ALBERT P. SACHS.